(12) United States Patent
Jourdan

(10) Patent No.: US 11,313,752 B2
(45) Date of Patent: Apr. 26, 2022

(54) LEAK DETECTION MODULE AND METHOD OF CHECKING THE SEAL OF AN OBJECT TO BE TESTED USING A TRACER GAS

(71) Applicant: PFEIFFER VACUUM, Annecy (FR)

(72) Inventor: Pascal Jourdan, Poisy (FR)

(73) Assignee: PFEIFFER VACUUM, Annecy (FR)

( * ) Notice: Subject to any disclaimer, the term of this patent is extended or adjusted under 35 U.S.C. 154(b) by 395 days.

(21) Appl. No.: 16/398,445

(22) Filed: Apr. 30, 2019

(65) Prior Publication Data

US 2019/0339154 A1 Nov. 7, 2019

(30) Foreign Application Priority Data

May 2, 2018 (FR) ...................... 18 70521

(51) Int. Cl.
| | |
|---|---|
| *G01M 3/22* | (2006.01) |
| *G10L 15/22* | (2006.01) |
| *G01M 3/20* | (2006.01) |
| *G02B 27/01* | (2006.01) |
| *G06F 3/01* | (2006.01) |
| *G06F 3/06* | (2006.01) |

(52) U.S. Cl.
CPC ............. *G01M 3/223* (2013.01); *G10L 15/22* (2013.01); *G01M 3/202* (2013.01); *G02B 27/017* (2013.01); *G06F 3/011* (2013.01); *G06F 3/067* (2013.01); *G10L 2015/223* (2013.01)

(58) Field of Classification Search
CPC .......... G01M 3/223; G01M 3/20; G01M 3/04; G01M 3/202; G02B 27/0172; G02B 2027/0138; G02B 2027/014; G02B 2027/0141; G02B 27/017; G02B 2027/0178; G06K 9/00671; G06T 19/006; G06T 11/20; G10L 15/22; G10L 2015/223; G06F 3/011; G06F 3/067; G06F 1/163

See application file for complete search history.

(56) References Cited

U.S. PATENT DOCUMENTS

| | | | |
|---|---|---|---|
| 2009/0314052 A1 | 12/2009 | Rolff et al. | |
| 2016/0260261 A1* | 9/2016 | Hsu | ........................ B23K 9/173 |
| 2018/0328808 A1 | 11/2018 | Jourdan et al. | |
| 2019/0339158 A1* | 11/2019 | Yanai | ...................... G01M 3/38 |

FOREIGN PATENT DOCUMENTS

| | | |
|---|---|---|
| CN | 105182535 B | 4/2018 |
| DE | 10 2005 028 557 A1 | 1/2007 |
| FR | 3 044 764 A1 | 6/2017 |
| WO | WO 2017/125327 A1 | 7/2017 |

OTHER PUBLICATIONS

French Preliminary Search Report dated Jan. 14, 2019 in French Application 18 70521, filed on May 2, 2018 ( with English Translation of categories of Cited Document & Written Opinion)

* cited by examiner

*Primary Examiner* — Phuong H Nguyen
(74) *Attorney, Agent, or Firm* — Oblon, McClelland, Maier & Neustadt, L.L.P.

(57) ABSTRACT

A leak detection module for checking a seal of an object to be tested using a tracer gas is provided, including: a leak detector; a manipulatable probe; and a human-machine interface including a voice recognition device configured to recognize a voice command controlling the leak detection module. A method for checking the seal of an object to be tested using a tracer gas is also provided.

10 Claims, 3 Drawing Sheets

LEAK DETECTION MODULE AND METHOD OF CHECKING THE SEAL OF AN OBJECT TO BE TESTED USING A TRACER GAS

The present invention concerns a leak detection module for checking the seal of an object to be tested using a tracer gas. The invention also concerns a method for checking the seal of an object to be tested using a tracer gas.

A known method for checking the seal of an object consists in carrying out a tracer gas "sniffer" or "spray" test, as it is known. These methods call upon the detection of the tracer gas through any leaks in the object to be tested.

In sniffer mode, a leak detector connected to a sniffer probe looks for the possible presence of the tracer gas around an object to be tested filled with the tracer gas, which is generally under pressure. In spray mode, the object to be tested is sprayed with the tracer gas using a spray gun, the interior volume of the object to be tested being connected to a leak detector. Leaks are looked for by moving the sniffer probe or the spray gun around the object to be tested, notably at the level of zones liable to have seal weaknesses, such as around seals. An increase in the measured tracer gas concentration signal reveals the presence of a leak at the location at which the probe is positioned.

It is not always easy for the user to carry out a measurement, however.

In fact, over and above manipulating the spray gun or the sniffer probe, the user may also have to manipulate accessories, such as a tool, a torch to locate the test zones or a remote control to control the leak detector remotely. The user may further need to use their hands to support themselves when they are in an uncomfortable position. It is then clear that it is not easy for the user to manipulate all these elements simultaneously to search for leaks.

One object of the present invention is therefore to propose a module and a method for detection of leaks that solve at least in part the aforementioned disadvantages.

To this end, the invention consists in a leak detection module for checking the seal of an object to be tested using a tracer gas, including a leak detector and a probe that can be manipulated by a user, characterized in that it further includes a human-machine interface including a voice recognition device configured to recognize a voice command from the user controlling the leak detection module. Voice control enables the user to control the leak detection module easily, even remotely, without having to immobilize one hand. Their hands are therefore available for the manipulation of the probe or accessories, which facilitates searching for leaks.

According to one embodiment, the leak detection module further includes a vision device comprising:
- a processor and display unit configured to communicate with the leak detector,
- a retaining means configured to retain the vision device on the head of the user, and
- a viewing surface fixed to the retaining means to be placed in the field of view of the user, the processor and display unit being configured to display in augmented reality on the viewing surface at least one item of information relating to leak detection,
the voice recognition device being configured to recognize a voice command from the user controlling the vision device.

The vision device includes for example at least one image capture device such as a video camera or a still camera configured to capture images in the field of view of the user.

The voice recognition device may be configured to recognize a voice command from the user commanding image capture by the image capture device. The image that can be captured includes the viewing surface on which the at least one item of information relating to leak detection is displayed in augmented reality.

The item of information includes for example at least one signal representing the tracer gas concentration measured by the leak detector.

It is therefore possible to control by voice the capture of one or more test photos to show on the one hand that the predefined test zone has indeed been tested and to show on the other hand the associated tracer gas concentration measurement. A seal certificate associated with the object to be tested can therefore be handed over to a client or to a quality assurance department, this certificate proving that the test zones have indeed been tested by the user and that the level of seal is below a predefined rejection threshold.

The voice recognition device may be configured to recognize a voice command from the user controlling the leak detector.

The voice recognition device is for example configured to recognize a voice command from the user commanding the starting of a measurement of the tracer gas concentration representing the rate of leakage from the object to be tested by the leak detector and/or reinitialization of the background noise and/or starting of calibration of the leak detector.

The probe may be a sniffer probe connected to the leak detector.

The probe may be a spray blower intended to be connected to a source of tracer gas.

The invention also consists in a method of checking the seal of an object to be tested using a tracer gas and by means of a leak detection module as described above, characterized in that the user controls the leak detection module by voice.

The user for example controls the leak detector of the leak detection module by voice.

According to one embodiment, an item of information relating to leak detection is displayed in augmented reality on a viewing surface placed in the field of view of a user by a vision device worn on the head of the user. The user may for example command by voice the capture by the image capture device of an image of the viewing surface on which the at least one item of information relating to leak detection is displayed in augmented reality.

Other features and advantages of the invention will emerge from the following description given by way of nonlimiting example and with reference to the appended drawings: in which.

In these figures identical elements bear the same reference numbers. The following embodiments are examples. Although the description refers to one or more embodiments, this does not necessarily mean that each reference concerns the same embodiment or that the features apply to only one embodiment. Single features of different embodiments may equally be combined or interchanged to produce other embodiments.

An "object to be tested" is defined as an object or an installation the seal of which is required to be checked.

Figure 1:
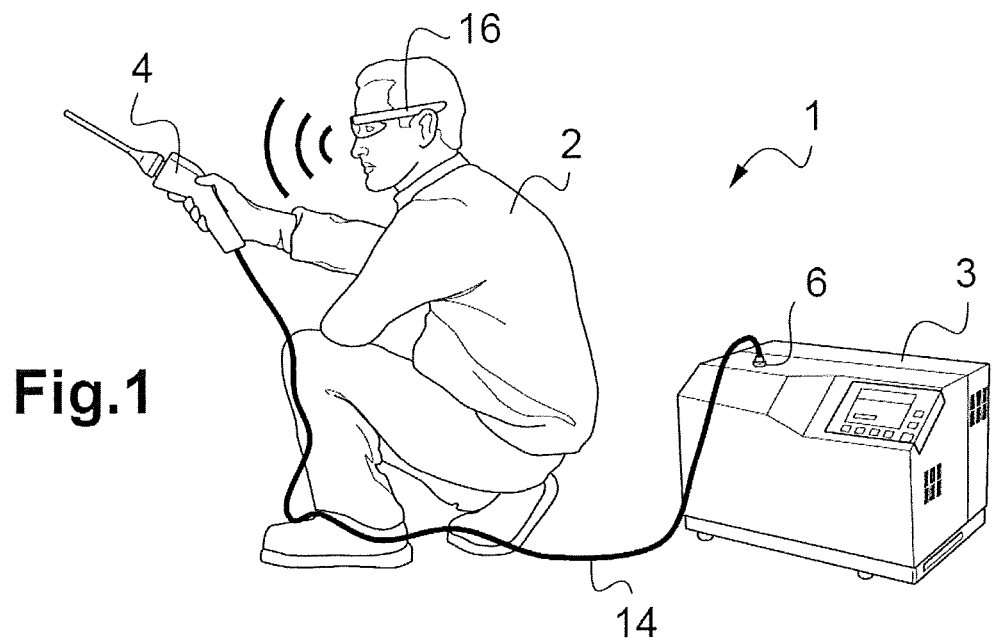
FIG. 1 shows a diagrammatic view of a user wearing a vision device and manipulating a sniffer probe connected to a leak detector.

FIG. 1 shows an example of a leak detection module 1 for checking the seal of an object to be tested using a tracer gas, being used by a user 2.

Figure 3:
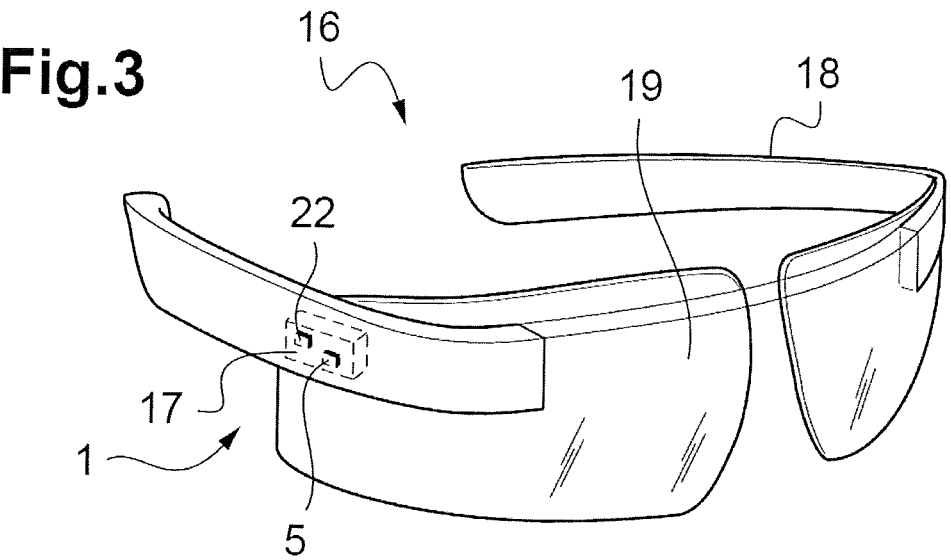
FIG. 3 show a diagrammatic view of an example of a vision device.

The leak detection module 1 includes a leak detector 3, a probe 4 that can be manipulated by the user 2 and a human-machine interface I including a voice recognition device 5 configured to recognize a voice command from the user 2 controlling the leak detection module 1 (FIG. 3).

Figure 2:
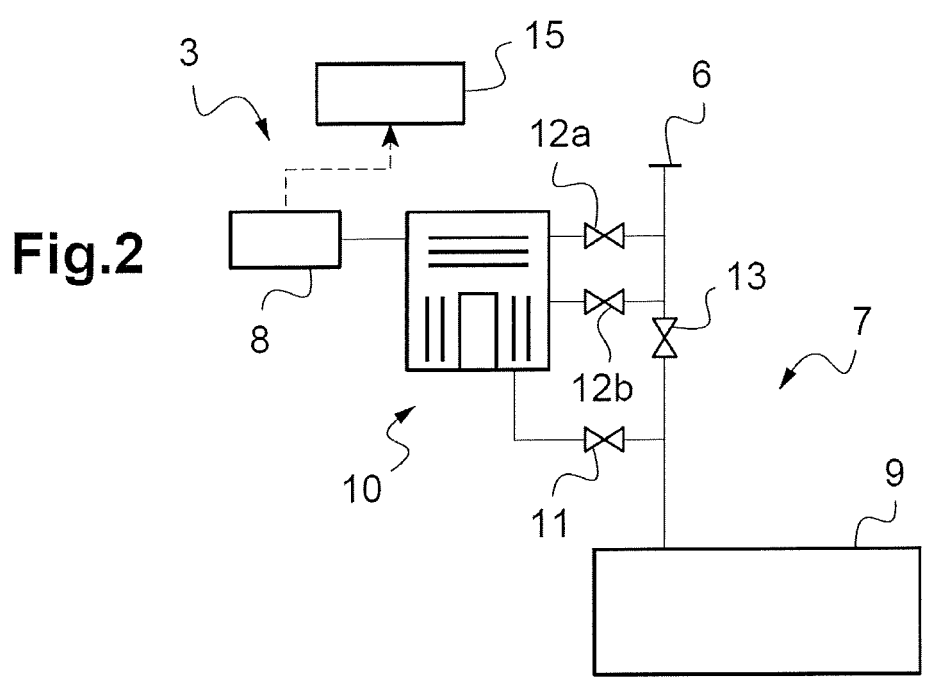
FIG. 2 show a diagrammatic view of an example of a leak detector.

The leak detector 3 includes for example and as shown in FIG. 2 a detection inlet 6, a pump device 7 and a gas detector 8.

The pump device 7 includes for example at least one primary vacuum pump 9 such as a diaphragm pump and at least one turbomolecular vacuum pump 10.

The gas detector 8 is connected to the turbomolecular vacuum pump 10, for example to its inlet. The gas detector 8 includes for example a mass spectrometer. The gas detector 8 in particular enables determination of a tracer gas concentration in the gases sampled at the detection inlet 6.

The outlet of the turbomolecular vacuum pump 10 is connected to the inlet of the primary vacuum pump 9 via a first isolating valve 11.

The detection inlet 6 of the leak detector 3 is for example connected to an intermediate stage of the turbomolecular vacuum pump 10 via at least one sampling valve 12a, 12b. The pump device 7 includes for example at least two sampling valves 12a, 12b, each valve 12a, 12b being connected to a distinct intermediate stage of the turbomolecular vacuum pump 10 so as to be able to adapt the sampling flow to the level of the leakage rate, the sampling valve 12a, 12b being connected to a branch from a pipe of the vacuum line arranged between the detection inlet 6 and a second isolating valve 13. The second isolating valve 13 is connected to the first isolating valve 11 and to the inlet of the primary vacuum pump 9.

The probe 4 includes a holding means enabling it to be manipulated by the user 2 (FIG. 1).

In the first embodiment shown in FIG. 1 the probe 4 is a sniffer probe.

The sniffer probe is connected to the detection inlet 6 of the leak detector 3 by a flexible pipe 14 so as to aspirate the gases surrounding the object to be tested, which is filled with tracer gas. Some of the gases aspirated by the pump device 7 are analyzed by the gas detector 8 which supplies a tracer gas concentration to a control unit 15 of the detector 3 (visible in FIG. 2). A tracer gas maximum threshold that is exceeded reveals a leak. Helium or hydrogen is generally used as the tracer gas because these gases pass more easily through small leaks than other gases because of the small size of their molecule and their high speed of movement.

The voice recognition device 5 (or automatic speech recognition device) includes a microphone or electroacoustic transducer capable of converting an acoustic signal into an electrical signal and a computer program enabling analysis of the human voice captured by means of the microphone to transcribe it into the form of a content such as a text usable by a computer or controller.

After training it, the voice recognition device 5 can be configured to identify the voice of the user in order to be able for example to adapt voice recognition to the language, accent or intonation of the user 2.

The voice recognition device 5 can be configured to recognize a voice command from the user 2 controlling the leak detector 3 of the module 1.

For example, the voice recognition device 5 may be configured to recognize a voice command from the user 2 commanding starting of a measurement of the tracer gas concentration representing the leakage rate of the object to be tested by the leak detector 3 and/or reinitialization of the background noise and/or starting of calibration of the leak detector 3.

Reinitialization of the background noise enables a zero value to be assigned to a measurement of the tracer gas concentration. This enables easier detection of the presence of a leak when the background noise level is high without waiting for a drop in the tracer gas and without ventilating the atmosphere.

The voice commands may be very simple, such as for example "reinitialize background noise" to command reinitialization of the background noise or "start a measurement" to command starting a measurement.

Voice control of the leak detector 3 therefore avoids the user 2 needing to carrying a remote control immobilizing their hand.

The voice recognition device 5 may be configured to recognize voice commands from the user 2 controlling other parameters of the leak detector 3, such as adjustment of the sound level representing the leakage rate measured by the leak detector 3. In fact, the leak detector 3 may include a sound emitting device, such as a beeper or a loudspeaker, the output frequency of which rises as the measurement signal representing the leakage rate rises. Adjustment of the sound level of the sound emitting device by voice control enables the user 2 to raise or lower the sound level of the sound emitting device without needing to move.

Also, the voice recognition device 5 may be configured to recognize voice commands from the user 2 controlling the setting of parameters of the reject thresholds of the leak detector 3 able to trigger an alert.

The computer program of the voice recognition device 5 is for example executed by the control unit 15 of the leak detector 3 or by a controller or processor carried by the user 2 or by the probe 4. The microphone of the voice recognition device 5 may be arranged in the leak detector 3 or may be carried by the user 2 or by the probe 4 in order better to capture the voice of the user 2.

The voice recognition device 5 further includes for example wireless, such as WIFI or Bluetooth, communication means configured to communicate wirelessly with complementary communication means of the control unit 15 to transmit the commands or the transcribed contents of the electrical signals or the electrical signals converted from the acoustic signals to the control unit 15.

The voice recognition device 5 may be configured to recognize a voice command from the user 2 controlling a vision device 16 of the module 1 (FIG. 1).

The vision device 16 is worn on the head of the user 2.

As can be seen better in FIG. 3, the vision device 16 includes a processor and display unit 17, a retaining means 18 and a viewing surface 19.

The retaining means 18 is configured to retain the vision device 16 on the head of the user 2. It includes for example a frame intended to rest on the nose of the user and to be supported on their ears, such as an eyeglasses frame, or includes an adjustable band around the head or a helmet or a support forming a headband.

The viewing surface 19 is fixed to the retaining means 18 so that it can be placed in the field of view of the user 2. The viewing surface 19 is formed by a transparent glass or plastic surface enabling the user to see through it.

The processor and display unit 17 includes one or more controllers or processors configured in particular to communicate with the control unit 15 of the leak detector 3 (FIGS. 2 and 3). It includes for example wireless, such as WIFI or Bluetooth, communication means configured to communicate wirelessly with complementary communication means of the control unit 15. The processor and display unit 17 is therefore able to send or to receive information relating to leak detection. The processor and display unit 17 is for example carried by the retaining means 18, e.g. by a side-piece of the retaining means 18.

The processor and display unit 17 is moreover configured to display in augmented reality on the viewing surface 19 at least one item of information 21 relating to leak detection. Augmented reality enables the user to see the information items 21 relating to leak detection superimposed on the real world.

Figure 4:
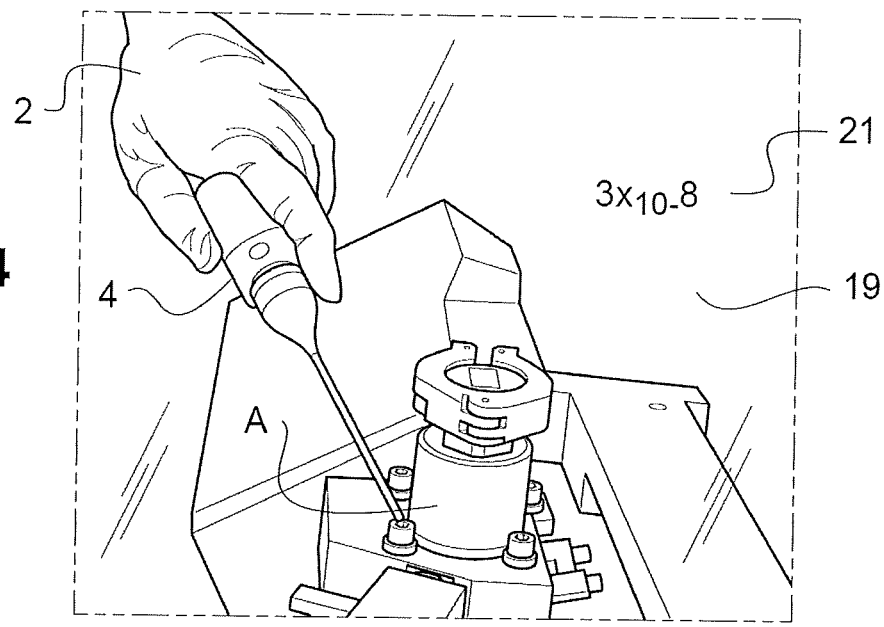
FIG. 4 show a diagrammatic view of an example of what can be seen by the user wearing the vision device from FIG. 3 when searching for leaks.

The item of information 21 includes for example at least one signal representing the tracer gas concentration measured by the leak detector 3 (FIG. 4). The tracer gas concentration is therefore displayed in the field of view of the user 2 wherever they happen to be looking. The information item 21 displayed therefore moves to where the user 2 is looking even if they turn their head away from the screen of the detector 3.

The signal may be displayed in different ways depending on what the user 2 requires. The signal is for example displayed in the form of a numerical value (FIG. 4), bar-graphs (graphic intensity bars) or a graph.

The displayed item of information 21 may indicate if the signal exceeds a maximum tracer gas concentration threshold, for example with the aid of a color code. Thus the signal may change color if the tracer gas concentration crosses a predefined rejection threshold. It is for example displayed in green if the measurement is below the threshold and in red if the measurement crosses the threshold.

The item of information 21 may include a signal representing an operating state of the leak detector 3, such as an alert or measurement in progress state, a fault, maintenance required or a recommendation to the user. The information item 21 on the operating state of the leak detector 3 for example enables the user who is not able to view the leak detector 3 directly to conclude that they are indeed carrying out a measurement to decide on the absence of leaks in the presence of a low or zero measurement signal.

According to one embodiment, the vision device 16 includes at least one image capture device 22 such as a video camera or a still camera configured to capture images in the field of view of the user 2 (FIG. 3).

The voice recognition device 5 may be configured to recognize a voice command from the user 2 commanding capture by the image capture device 22 of an image of the viewing surface 19 on which at least one information 21 relating to leak detection is displayed in augmented reality (FIGS. 3 and 4).

The voice command may be very simple such as for example "take a photo" to trigger taking a photograph and saving of the image by the image capture device 22.

The computer program of the voice recognition device 5 is for example executed by the processor and display unit 17.

The microphone of the voice recognition device 5 may be carried by the retaining means 18.

It is therefore possible to command by voice the taking of one or more photos of the test to show on the one hand that the predefined test zone has indeed been tested and to show on the other hand the associated measurement of tracer gas concentrations. A seal certificate associated with the object A to be tested can therefore be handed over to a client or to a quality assurance service, this certificate proving that the test zones have indeed been tested by the user 2 and that the leakage level is below a predefined rejection threshold.

There will now be described an example of the operation of the leak detection module 1 and the associated method of checking the seal of an object A to be tested using a tracer gas (FIGS. 1 and 4).

The object A to be tested is first filled with tracer gas, for example under pressure.

The user 2 may identify themselves to the leak detection module 1 by voice recognition.

The user 2 then moves the tip of the probe 4 over the test zones and is able, when ready, to speak a voice command controlling the leak detector 3 for example by starting measurement of the tracer gas concentration and/or reinitialization of the background noise.

The probe 4 connected to the leak detector 3 aspirates the gases surrounding the object A to be tested in the test zone. Some of the gases sampled in this way, possibly containing the tracer gas revealing a leak, are then analyzed by the gas analyzer 8, which supplies a measurement of the tracer gas concentration to the control unit 15 of the leak detector 3.

The user 2 can place a vision device 16 on their head to see the viewing surface 19 in their field of view.

The control unit 15 then sends the tracer gas concentration measurement, processed or not, to the processor and display unit 17. The processor and display unit 17 displays on the viewing surface 19 (FIG. 4) an item of information 21 relating to leak detection in augmented reality, such as the tracer gas concentration measurement in the form of a numerical value.

The tracer gas concentration measurement can therefore be displayed in real time in the field of view of the user 2. The user 2 therefore has access to the measurement without needing to look away from the test zone and without having to hold a remote screen.

The measured tracer gas concentration values and the associated sequence of measurement operations performed by the user 2 can be recorded.

The user 2 can speak a voice command for capture of an image by the image capture device 22, in particular an image of the viewing surface 19 on which the at least one item of information 21 relating to leak detection is displayed in augmented reality.

The sequence of measurement operations performed by the user 2 on the object A to be tested can therefore be photographed to provide one or more test photos of the object A to be tested. These results can be associated with serial numbers of the objects A to be tested, which is particularly useful on the production line. This enables centralization of all the results and enables the user 2 to come back afterwards to a test that has been carried out.

Figure 5:
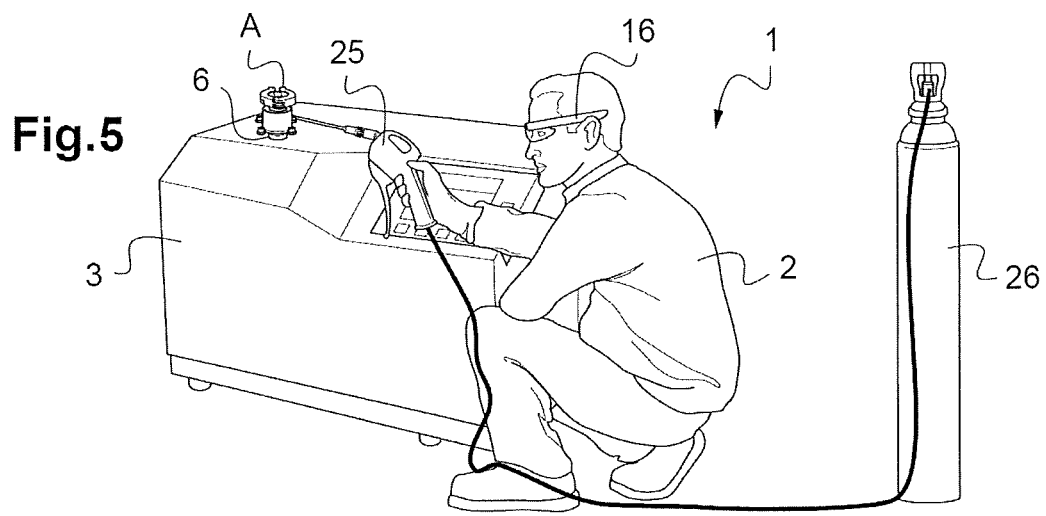
FIG. 5 show a diagrammatic view of a user using a leak detection module for checking the seal of an object to be tested by spraying tracer gas.
Figure 6:
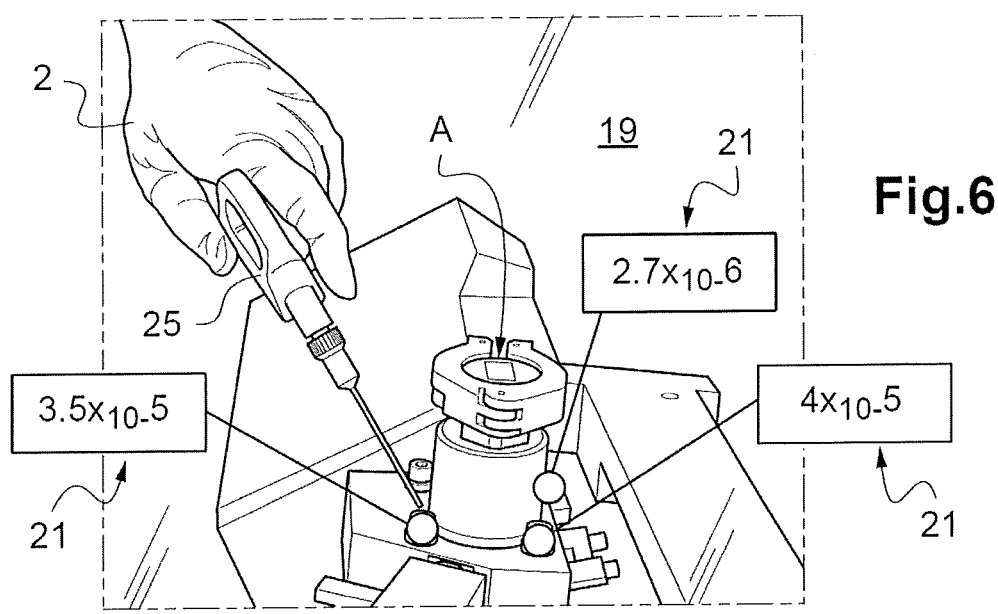
FIG. 6 shows an example of what can be seen by the user during a seal check using tracer gas spraying.

FIGS. 5 and 6 show an embodiment of a check on the seal of an object to be tested by spraying.

This embodiment differs from the previous one by the fact that here the probe 25 is a spray blower connected to a tracer gas source 26 to blow tracer gas around the object A to be tested. The object A to be tested is connected to the detection inlet 6 of the leak detector 3 via which a vacuum is produced in it (FIGS. 2 and 5). In use, the user 2 sprays the tracer gas around the object A to be tested using the probe 25 (FIGS. 5 and 6).

As before the user can, when ready, command by voice the leak detector 3, for example to start measurement of the tracer gas concentration and/or to reinitialize the background noise.

Some of the gases sampled by the pump device 7 of the leak detector 3, possibly containing tracer gas revealing a leak, is then analyzed by the gas analyzer 8, which supplies a tracer gas concentration measurement to the control unit 15 of the leak detector 3 (FIG. 2).

The user 2 can also place the vision device 16 on their head to see the viewing surface 19 in their field of view (FIGS. 3 and 5).

The control unit 15 then sends the tracer gas concentration measurement, processed or not, to the processor and display unit 17. The processor and display unit 17 displays on the viewing surface 19 (FIG. 6) an item of information 21 relating to leak detection in augmented reality, such as the tracer gas concentration measurement in the form of a numerical value.

The measured tracer gas concentration values and the associated sequence of measurement operations performed by the user 2 can be recorded.

As before the user 2 can command by voice the capture by the image capture device 22 of an image of the viewing surface 19 on which the at least one item of information 21 relating to leak detection is displayed in augmented reality.

The invention claimed is:

1. A leak detection module for checking a seal of an object to be tested using a tracer gas, comprising:
    a leak detector;
    a manipulatable probe; and
    a human-machine interface including a voice recognition device configured to recognize a voice command controlling the leak detection module, and recognize a voice command controlling the leak detector;
    wherein the voice recognition device is further configured to recognize a voice command commanding a starting of a measurement of a concentration of the tracer gas representing a rate of leakage from the object to be tested by the leak detector and/or reinitialization of background noise and/or starting of a calibration of the leak detector.

2. The leak detection module according to claim 1, further comprising a vision device comprising:
    a processor and display unit configured to communicate with the leak detector;
    a retaining device configured to retain the vision device on a head of a user; and
    a viewing surface fixed to the retaining device and configured to be placed in a field of view of the user,
    wherein the processor and display unit are further configured to display in augmented reality on the viewing surface at least one item of information relating to leak detection, and
    wherein the voice recognition device is further configured to recognize a voice command controlling the vision device.

3. The leak detection module according to claim 2, wherein the vision device further comprises at least one image capture device configured to capture images in the field of view of the user.

4. The leak detection module according to claim 3, wherein the voice recognition device is further configured to recognize a voice command commanding image capture by the at least one image capture device of the viewing surface on which the at least one item of information relating to leak detection is displayed in augmented reality.

5. The leak detection module according to claim 1, wherein the manipulatable probe is a sniffer probe connected to the leak detector.

6. The leak detection module according to claim 1, wherein the manipulatable probe is a spray blower configured to be connected to a source of the tracer gas.

7. A method of checking a seal of an object to be tested using a tracer gas and by a leak detection module according to claim 1, comprising:
    controlling the leak detection module by voice; and
    controlling the leak detector of the leak detection module by voice.

8. The method according to claim 7, wherein at least one item of information relating to leak detection is displayed in augmented reality on a viewing surface placed in a field of view of the user by a vision device worn on a head of the user.

9. The method according to claim 8, wherein the user commands by voice a capture by an image capture device of an image of the viewing surface on which the at least one item of information relating to leak detection is displayed in augmented reality.

10. The method according to claim 8, wherein the at least one item of information includes at least one signal representing a concentration of the tracer gas measured by the leak detector.

* * * * *